United States Patent
Furlong (10) Patent No.: US 8,429,985 B2
(45) Date of Patent: Apr. 30, 2013

(54) APPARATUS FOR USE IN DETERMINING A PLURALITY OF CHARACTERISTICS OF A MULTIPHASE FLOW WITHIN A PIPE

(75) Inventor: Edward Randall Furlong, Beverly, MA (US)

(73) Assignee: General Electric Company, Schenectady, NY (US)

( * ) Notice: Subject to any disclaimer, the term of this patent is extended or adjusted under 35 U.S.C. 154(b) by 325 days.

(21) Appl. No.: 12/862,123

(22) Filed: Aug. 24, 2010

(65) Prior Publication Data
US 2012/0048030 A1    Mar. 1, 2012

(51) Int. Cl.
*G01F 1/74* (2006.01)
*G01F 1/37* (2006.01)
*G01F 1/44* (2006.01)

(52) U.S. Cl.
USPC ............... 73/861.04; 73/861.52; 73/861.63

(58) Field of Classification Search .................. None
See application file for complete search history.

(56) References Cited

U.S. PATENT DOCUMENTS

| | | | |
|---|---|---|---|
| 5,551,305 A | 9/1996 | Farchi et al. | |
| 5,591,922 A | 1/1997 | Segeral et al. | |
| 5,736,650 A * | 4/1998 | Hiron et al. | 73/861.63 |
| 6,155,102 A * | 12/2000 | Toma et al. | 73/61.44 |
| 6,467,358 B1 * | 10/2002 | Nishi et al. | 73/861.04 |
| 6,698,297 B2 | 3/2004 | Gysling | |
| 6,755,086 B2 * | 6/2004 | Salamitou et al. | 73/861.04 |
| 6,776,054 B1 | 8/2004 | Stephenson et al. | |
| 6,935,189 B2 * | 8/2005 | Richards | 73/861.04 |
| 7,293,471 B2 | 11/2007 | Lund Bo et al. | |
| 7,299,140 B2 | 11/2007 | Liu et al. | |
| 7,607,359 B2 | 10/2009 | Hecht et al. | |
| 7,983,864 B2 * | 7/2011 | Hu et al. | 702/65 |
| 2002/0139197 A1 * | 10/2002 | Salamitou et al. | 73/861.04 |
| 2004/0182172 A1 * | 9/2004 | Richards | 73/861.04 |
| 2008/0319685 A1 * | 12/2008 | Xie et al. | 702/45 |
| 2010/0138169 A1 | 6/2010 | Johansen et al. | |
| 2012/0048031 A1 * | 3/2012 | Furlong et al. | 73/861.04 |

FOREIGN PATENT DOCUMENTS

WO     2009018694 A1    2/2009

* cited by examiner

*Primary Examiner* — Harshad R Patel
(74) *Attorney, Agent, or Firm* — Global Patent Operation; Mark A. Conklin (57) ABSTRACT

An apparatus for use in determining a plurality of characteristics of a multiphase flow within a pipe is disclosed. In one exemplary embodiment, the apparatus comprises first and second constrictions, a sheltered zone between the first and second constrictions, a sensing device coupled to an interior wall of the pipe, and a sheltered device coupled to the interior wall of the pipe and located within the sheltered zone. A first characteristic of the plurality of characteristics is determinable from data generated by the sensing device. A second characteristic of the plurality of characteristics is determinable from data generated by the sheltered device. In one exemplary embodiment, the first characteristic is a gas fraction, and the sensing device is a plurality of pressure sensors. In another exemplary embodiment, the second characteristic is a phase fraction, and the sheltered device is a plurality of electrical impedance spectroscopy (EIS) electrodes.

20 Claims, 6 Drawing Sheets

APPARATUS FOR USE IN DETERMINING A PLURALITY OF CHARACTERISTICS OF A MULTIPHASE FLOW WITHIN A PIPE

BACKGROUND OF THE INVENTION

The subject matter herein relates generally to flow meters and, more particularly, to an improved flow meter for use in determining a plurality of characteristics of a flow comprising more than one phase of matter such as liquid and gas (a "multiphase flow") within a pipe.

Flow meters provide critical measurements concerning the characteristics of a multiphase flow within a pipe. For example, in the oil industry, there are various situations in which there is a need to use a flow meter to determine a fraction of the gas phase (the "gas fraction") and a fraction of the liquid phase (the "liquid fraction") comprising the multiphase flow. A dual venturi flow meter can be used for this purpose. In a typical dual venturi flow meter, there are two constrictions, each being formed by a separate constricting conical section and a separate expanding conical section. Differences in pressure of the multiphase flow across the constrictions bear an empirical relationship to the gas fraction and the liquid fraction. The differences in pressure can be determined from data generated by pressure sensors mounted within the flow meter. Each pressure sensor has a face that can be susceptible to erosion as a result of impingement from particles, such as sand, present within the multiphase flow. This susceptibility is exacerbated if the face protrudes from an interior wall of the pipe.

Also in a typical venturi flow meter, the constricting conical sections constrict at an angle of thirty degrees, and the expanding conical sections expand at an angle of five degrees. The angle of the expanding conical sections in particular can significantly add to the length of the flow meter. The length of the flow meter can be ten to fifteen times the diameter of the pipe, and the diameter can be between 76.2 centimeters (thirty inches) and 114.3 centimeters (forty-five inches).

The aggregate lengths of a dual venturi flow meter and a second type of flow meter can be prohibitive of their collective serial installation within a subsea Christmas tree, which is an assembly of valves, spools, and fittings used to control the flow into or out of a subsea well, such as an oil well or a gas well. Examples of subsea Christmas trees include conventional, dual bore, mono bore, through flow line (TFL), horizontal, mudline horizontal, side valve, and through bore tree (TBT) trees. In a practical use case scenario, after the gas fraction and the liquid fraction are determined using a dual venturi flow meter, it may be desirious to determine a liquid composition of the multiphase flow using a water cut flow meter. The liquid composition can indicate the amount of liquid hydrocarbons and the amount of water present in the liquid fraction. However, the amount of space within a subsea Christmas tree may not accommodate both a dual venturi flow meter and a water cut flow meter for use in determining each of the gas fraction, the liquid fraction, and the liquid composition.

It would be advantageous to provide a flow meter that can be used within a subsea Christmas tree to determine a plurality of characteristics of a multiphase flow that are typically determined through use of a dual venturi flow meter and a second type of flow meter, and that shelters devices mounted therein from impingement by particles within the multiphase flow.

BRIEF DESCRIPTION OF THE INVENTION

In one embodiment, an apparatus for use in determining a plurality of characteristics of a multiphase flow within a pipe comprises first and second constrictions, a sheltered zone between the first and second constrictions, a sensing device coupled to an interior wall of the pipe, and a sheltered device coupled to the interior wall of the pipe and located within the sheltered zone. A first characteristic of the plurality of characteristics is determinable from data generated by the sensing device. A second characteristic of the plurality of characteristics is determinable from data generated by the sheltered device.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. Thus, for further understanding of the invention, reference can be made to the following detailed description, read in connection with the drawings in which.

DETAILED DESCRIPTION OF THE INVENTION

Figure 1:
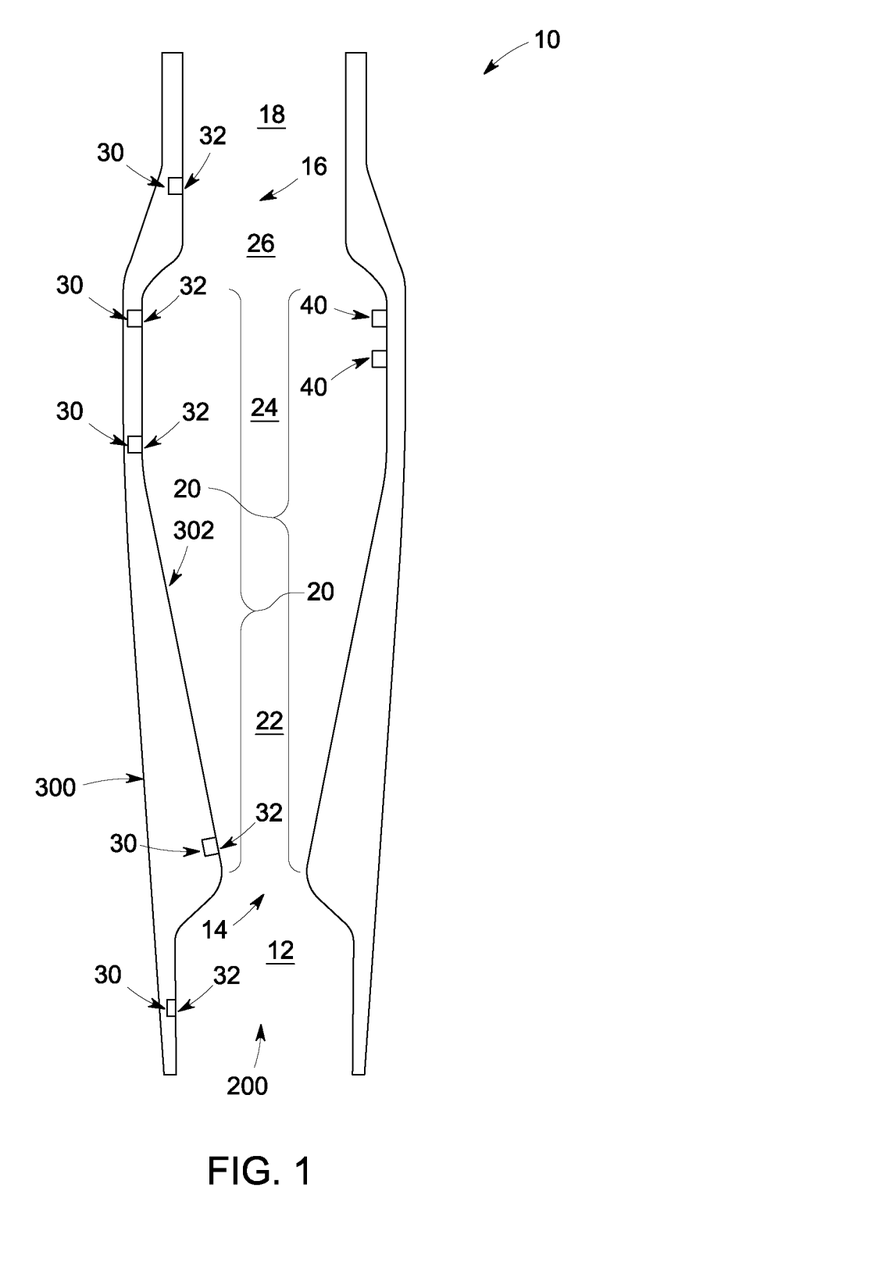
FIG. 1 is a cross-sectional side view of an apparatus according to one exemplary embodiment of the invention.

FIG. 1 is a cross-sectional side view of an apparatus 10 according to one exemplary embodiment of the invention. Apparatus 10 can be used for determining a plurality of characteristics 100 (shown in FIG. 6) of a multiphase flow 200 within a pipe 300. Apparatus 10 can comprise a first cylindrical section 12 leading into a first constriction 14, a second constriction 16 leading into a second cylindrical section 18, a sheltered zone 20 between first constriction 14 and second constriction 16, a sensing device 30 coupled to an interior wall 302 of pipe 300, and a sheltered device 40 coupled to interior wall 302 and located within sheltered zone 20. First constriction 14 and second constriction 16 can cause a Venturi effect on multiphase flow 200. A Venturi effect is a reduction in fluid pressure that results when a fluid flows through a constricted section of a pipe. The difference in pressure of the fluid before the constriction and at the constriction (a "differential pressure" or "DP") follows Bernoulli's equation:

$$P_1 + \frac{1}{2}\rho v_1^2 + \rho g h_1 = P_2 + \frac{1}{2}\rho v_2^2 + \rho g h_1 \qquad (1)$$

where $P_1$ is the pressure of the fluid before the constriction, $P_2$ is the pressure of the fluid at the constriction, $v_1$ is the velocity of the fluid, before the constriction, $v_2$ is the velocity of the fluid at the constriction, $h_1$ is the height at which $P_1$ and $v_1$ were measured, $h_2$ is the height at which $P_2$ and $v_2$ were measured, g is the gravitational constant, and p is the density of the fluid.

As the pressure of the fluid decreases, the velocity of the fluid increases through the constriction to satisfy the equation of continuity, which stands for the proposition that the total amount of fluid inside any region of a pipe can only change by the amount that passes in or out of the region through its boundaries. The increased velocity of multiphase flow 200 through first constriction 14 can cause particles, such as sand, contained therein to travel through a central area of sheltered zone 20 such that the particles are less likely to impinge and erode sheltered device 40 and sensing device 30, if sensing device 30 is located within sheltered zone 20.

Sheltered zone 20 can comprise a conical section 22 expanding from first constriction 14 and a sheltered cylindrical section 24 extending from conical section 22. Second cylindrical section 18 can be shorter than conical section 22, such that the length of apparatus 10 can be less than that of a typical dual venturi flow meter and can facilitate the installation of apparatus 10 within a subsea Christmas tree. At conical section 22, multiphase flow 200 can recover a fraction of the pressure lost while traveling through first constriction 14. This is because, in accordance with the Venturi effect, changes in the cross-sectional area of a pipe cause changes in the pressure of the fluid flowing through the cross-sectional area. Thus, also in accordance with the Venturi effect, multiphase flow 200 can again lose pressure while traveling through second constriction 16.

In one exemplary embodiment, a diameter of pipe 300 at sheltered cylindrical section 24 can be greater than a diameter of pipe 300 at first cylindrical section 12 and a diameter of pipe 300 at second cylindrical section 18, and the diameter of pipe 300 at first cylindrical section 12 and the diameter of pipe 300 at second cylindrical section 18 can be the same. Thus, two topologically different regions can be arranged in series in apparatus 10, the first being characterized by first cylindrical section 12, first constriction 14, and conical section 22, and the second being characterized by a cavity 26 extending from sheltered zone 20 and constricting into second constriction 16, second constriction 16, and second cylindrical section 18.

Sensing device 30 can be a plurality of pressure sensors located within and/or outside of sheltered zone 20 and can comprise a face 32 upon which pressure exerted by multiphase flow 200 can be measured. Face 32 of at least one of the pressure sensors can be recessed into interior wall 302. An advantage that may be realized in the practice of this embodiment is that face 32 can be protected from impingement of particles such as sand contained in multiphase flow 200. A subset of the pressure sensors can be placed before and at each of first constriction 14 and second constriction 16 so that two differential pressures can be determined.

In one exemplary embodiment of the invention, sheltered device 40 is a plurality of electrical impedance spectroscopy (EIS) electrodes, each of which can measure an impedance of multiphase flow 200. The impedance of multiphase flow 200 can be one of the capacitance, conductance, resistance, admittance or inductance of multiphase flow 200.

Figure 2:
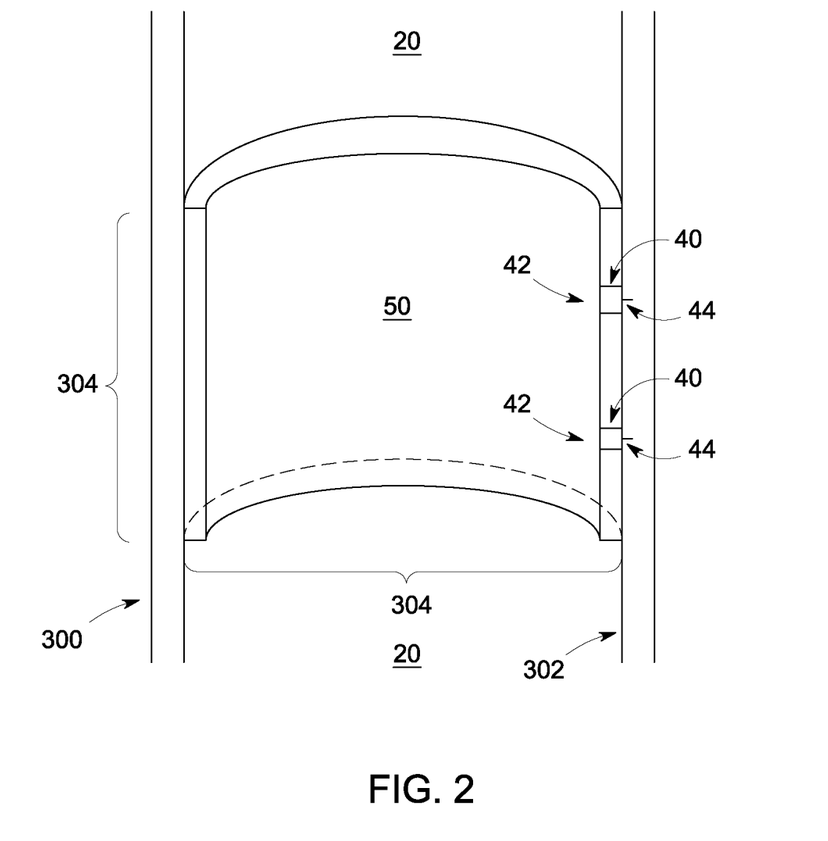
FIG. 2 is a configuration of electrical impedance spectroscopy (EIS) electrodes within an apparatus according to one exemplary embodiment of the invention.

FIG. 2 is a configuration of electrical impedance spectroscopy (EIS) electrodes within apparatus 10 according to one exemplary embodiment of the invention. At least one of the EIS electrodes can have a face 42 and a post 44. Each face 42 can be embedded in a dielectric material 50 that is disposed around an interior circumference 304 of pipe 300. Dielectric material 50 can be any material with negligible electrical or thermal conductivity, such as glass. Interior circumference 304 can be located within sheltered zone 20. Post 44 can be sealed in dielectric material 50 and can be inserted into interior wall 302.

Figure 3:
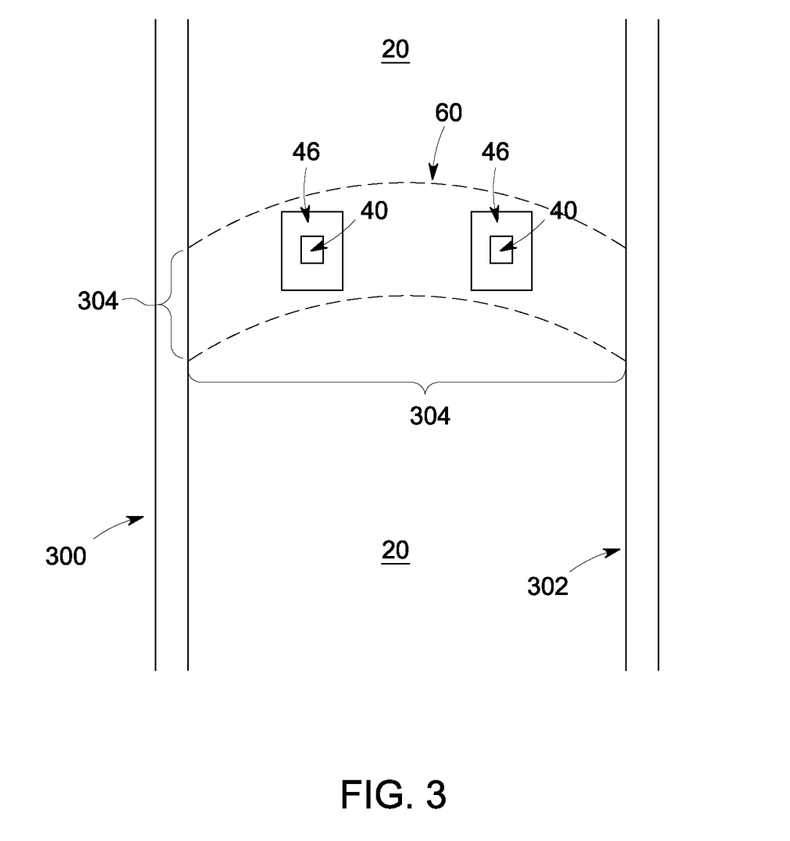
FIG. 3 is an alternative configuration of EIS electrodes within an apparatus according to one exemplary embodiment of the invention.

FIG. 3 is an alternative configuration of EIS electrodes within apparatus 10 according to one exemplary embodiment of the invention. Each of at least two of the EIS electrodes can be contained within a seal 46 and can be arranged in a ring configuration 60 encircling internal circumference 304. Seal 46 can be comprised of glass and metal, wherein the glass serves as both a seal and an insulator. In another exemplary embodiment, ring configuration 60 can comprise a first ring and a second ring with eight of the EIS electrodes in first ring and eight of the EIS electrodes in second ring.

Figure 4:
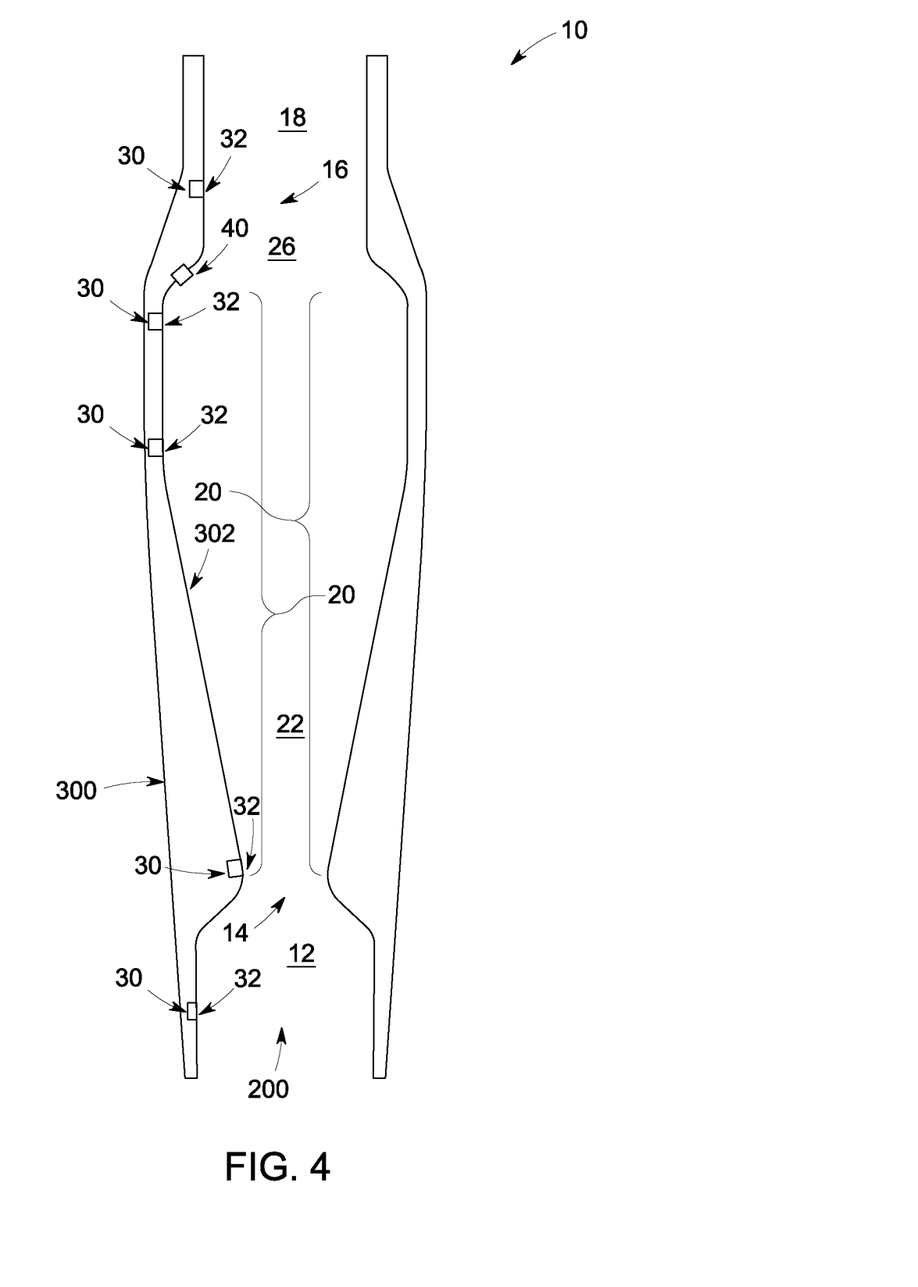
FIG. 4 is an alternative cross-sectional side view of an apparatus according to one exemplary embodiment of the invention.

FIG. 4 is an alternative cross-sectional side view of apparatus 10 according to one exemplary embodiment of the invention. In the exemplary embodiment shown, sheltered device 40 is a microwave sensor. The microwave sensor can be located in sheltered zone 20 at cavity 26 and can be operative to generate an electromagnetic field within pipe 300 for interaction with multiphase flow 200.

Figure 5:
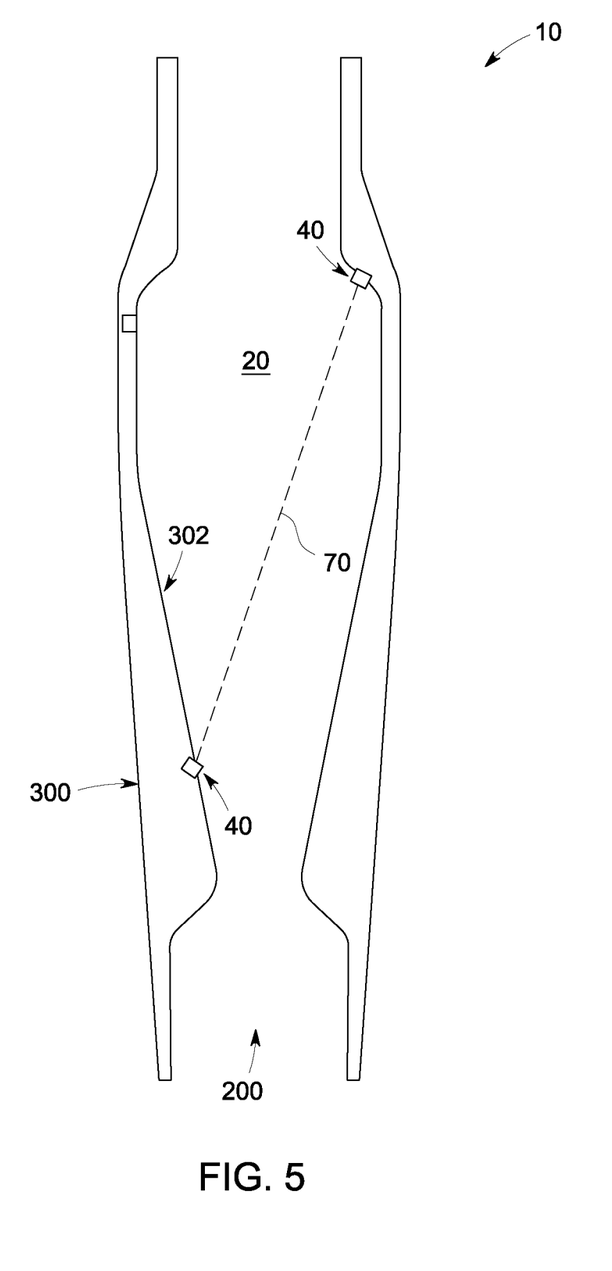
FIG. 5 is an alternative cross-sectional side view of apparatus 10 according to one exemplary embodiment of the invention.

FIG. 5 is an alternative cross-sectional side view of apparatus 10 according to one exemplary embodiment of the invention. In the exemplary embodiment shown, sheltered device 40 is a pair of ultrasonic transducers. Although FIG. 5 shows a single pair of transducers coupled to interior wall 302 within sheltered zone 20 and forming a single ultrasonic path 70, it will be understood by a person of ordinary skill in the art that two or more pairs of transducers, each forming separate ultrasonic paths, can be coupled to interior wall 302 within sheltered zone 20. Based on the direction of multiphase flow 200, one of the transducers can be installed upstream of the other of the transducers. The ultrasonic path 70 can be on the center of pipe 300 or on chordal paths (i.e., path not on the center of pipe 300). Each transducer, when energized, transmits an ultrasonic signal along the ultrasonic path 70 through the flowing fluid that is received by and detected by the other transducer.

The path velocity ($V_p$) of the fluid averaged along an ultrasonic path 70 can be determined as a function of the differential between the upstream transit time ($t_{up}$) (i.e., the time of an ultrasonic signal traveling along the ultrasonic path 70 from the downstream transducer upstream to the upstream transducer against the direction of multiphase flow 200) and the downstream transit time ($t_{dn}$) (i.e., the time of an ultrasonic signal traveling along the ultrasonic path 70 from the upstream transducer downstream to the downstream transducer with the direction of multiphase flow 200) of the ultrasonic signals. In the presence of fluid flow, the downstream transit time ($t_{dn}$) is faster (or shorter) that the upstream transit time ($t_{up}$). Since the transit time differential ($\Delta t$) is proportional to the path velocity ($V_p$) of the fluid, the path velocity ($V_p$) of the fluid averaged along the ultrasonic path 70 can be determined as a function of the transit time differential ($\Delta t$) as well as other known parameters, such as diameter of pipe 300, ultrasonic path length, and the angle formed between the ultrasonic path 70 and the direction of multiphase flow 200 as shown in FIG. 5.

Figure 6:
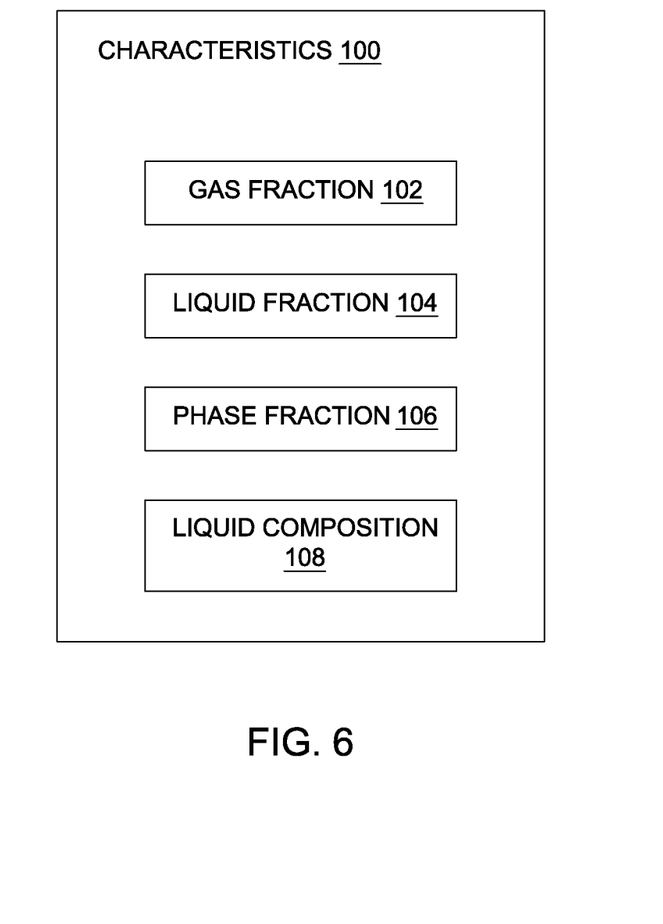
FIG. 6 is a block diagram of characteristics of a multiphase flow that can be determined through the use of an apparatus according to one exemplary embodiment of the invention.

FIG. 6 is a block diagram of characteristics 100 of multiphase flow 200 that can be determined through the use of apparatus 10 according to one exemplary embodiment of the invention. Characteristics 100 can comprise gas fraction 102, liquid fraction 104, phase fraction 106, and liquid composition 108. While, for example, gas fraction 102 and liquid fraction 104 can be determined using a dual venturi flow meter and liquid composition 108 can be determined using a water cut flow meter, the aggregate length of a dual venturi flow meter and a water cut flow meter can be prohibitive of the installation of both flow meters within a subsea Christmas tree. An advantage that may be realized in the practice of some embodiments of apparatus 10 is that apparatus 10 can be used to determine each of characteristics 100 in a single apparatus so dimensioned to fit within a subsea Christmas tree. In one exemplary embodiment, this can be accomplished by locating sheltered device 40 within sheltered zone 20 of apparatus 10 rather than in a separate flow meter.

Gas fraction 102 and liquid fraction 104 can be determined in any number of manners, as will be appreciated by one of skill in the art. An exemplary series of formulas for determining gas fraction 102 and liquid fraction 104 according to one exemplary embodiment of the invention, wherein multiphase flow 200 is predominantly comprised of gas, is discussed below. The gas content can be in the range of 90-100 volume-percentage, but will typically be about 95% (volume).

The single-phase gas rate is generally given by the following standard formula, which applies for all pipe flow accelerational differential pressure devices, e.g., apparatus 10:

$$Q_{g0} = \frac{\pi D^2}{4} C_d \cdot \gamma \sqrt{\frac{2 \cdot \Delta P}{\rho_g \cdot (\beta^{-4} - 1)}}, \quad (2)$$

where $Q_{g0}$ is the single phase gas flow rate [m$^3$/s], D is the pipe (e.g., pipe 300) inner diameter [m], $\Delta P$ is the differential pressure across the flow constriction (e.g., first constriction 14 or second constriction 16) [Pa], which can be determined from data (not shown) generated from sensing device 30 in embodiments wherein sensing device 30 is a plurality of pressure sensors, $\rho_g$ is the gas density [kg/m$^3$], $$\beta = \sqrt{\frac{A_{constriction}}{A_{pipe}}} \quad (3)$$

is the beta ratio representing the relative flow cross section reduction, $\gamma$ is the gas expansibility and $C_d$ is the so-called discharge coefficient representing a correction related to the fact that the effective flow constriction may differ from the physical cross section reduction.

When using DP measurements to find the mass flow in 2-phase wet gas flow, the standard formulas should be corrected for the appearance of liquid in the gas. This is usually done by the introduction of so-called two-phase multipliers that are functions of the individual fractions of gas and liquid and of the density of each of the components. The 2-phase multiplier represents the so-called overreading of differential pressure. The term overreading is used because the differential pressure with liquid present in the gas is higher than it would have been if the gas were flowing alone. The differential pressure overreading is caused by the work performed by the gas in order to accelerate the liquid phase through the flow constriction. The 2-phase multiplier, $\Phi_g$ is defined as:

$$\Phi_g = \sqrt{\frac{\Delta p}{\Delta p_g}} \quad (4)$$

where $\Delta p$ is the actual differential pressure while $\Delta p_g$ is the differential pressure one would have if the gas were flowing alone. According to the Lochard-Martinelli theory, the gas rate can be written:

$$Q_g = \frac{Q_{g0}}{\Phi_g} \quad (5)$$

where $Q_g$ is the gas flow rate in a 2-phase wet gas flow situation, $Q_{g0}$ is the gas flow rate one would get from the measured differential pressure assuming the gas flow alone according to (2), while $\Phi_g$ is the so-called 2-phase multiplier correcting for the appearance of liquids in the gas.

The 2-phase multiplier is a function of the individual fractions of gas and liquid and on the density ratio. It is usually written as a function of the Lochard-Martinelli parameter, $X_{LM}$ as:

$$\Phi_g = \Phi_g\left(\alpha_g, \frac{\rho_g}{\rho_l}\right) = \Phi_g(X_{LM}) \text{ where} \quad (6)$$

$$X_{LM} = \frac{1-\alpha_g}{\alpha_g} \sqrt{\frac{\rho_g}{\rho_l}}, \quad (7)$$

$\alpha_g$ is the gas mass flow fraction, $\rho_g$ is the gas density and $\rho_l$ is the liquid density. The function (6) is an empirical correlation function, which can e.g. for a typical device can be written in the form:

$$\Phi_g(X_{LM}) = \sqrt{1 + CX_{LM} + X_{LM}^2} \quad (8)$$

$$C = \left(\frac{\rho_g}{\rho_l}\right)^n + \left(\frac{\rho_l}{\rho_g}\right)^n \quad (9)$$

where n is a device characteristic exponent of the order 0.1-0.5.

Once the gas rate has been found according to (5), the liquid flow rate, $Q_l$, can be calculated as:

$$Q_l = Q_g \frac{1-\alpha_g}{\alpha_g} \quad (10)$$

To be able to measure the individual gas and liquid flow rates in a wet gas stream using the framework in the above sections, the individual densities of the gas and liquid ($\rho_g$ and $\rho_l$) as well as the individual fractions of gas ($\alpha_g$) and liquid ($\alpha_l=1-\alpha_g$) must be known in advance. The densities can usually be found from pressure and temperature measurements combined with PVT calculations, and for the best accuracy also from an additional measurement of the water fraction, while the individual fractions of gas and liquid may often be unknown and varying.

Two DP measurements, which contain independent information (different $\Phi_g$ functions), can be combined to determine the gas fraction 102 and liquid fraction 104. As a result, a measure of $\alpha_g, \alpha_l$ as well as the individual flow rates of gas and liquid can be obtained.

In constructing a double DP device for individual measurement of gas and liquid, the double DP device must be designed so that the two DP readings are different in that they contain independent information. This can be accomplished by measuring the differential pressures over two topologically different (geometries that cannot be transformed into each other by continuous deformations) regions arranged in series in a pipe section, e.g., a first region characterized by first cylindrical section 12, first constriction 14, and conical section 22, and a second region characterized by cavity 26, second constriction 16, and second cylindrical section 18. The core of constructing a double DP device for the detection of liquid content is that the two differential pressures will react differently to the presence of liquids in the gas.

In general, one could, from Eq. (2) and Eq. (5) write the measured differential pressure in the two regions as functions of the gas fraction and of the gas flow rate:

$$\alpha p_1 = \Delta p_1(Q_g \alpha_g) = C_1 Q_g^2 \Phi_{g1}^2 \rho_g \quad (11)$$

$$\alpha p_2 = \Delta p_2(Q_g \alpha_g) = C_2 Q_g^2 \Phi_{g2}^2 \rho_g \quad (12)$$

where in the simplest model, $C_1$ and $C_2$ are constants characterizing each differential pressure while $\Phi_{g1}$ and $\Phi_{g2}$ are respectively the two-phase multipliers of the two differential pressures. According to the framework in the sections above, the differential pressure ratio goes as:

$$\frac{\Delta p_1}{\Delta p_2} \propto \left(\frac{\Phi_{g1}}{\Phi_{g2}}\right)^2 \quad (13)$$

If the two regions have a difference in their response with respect to the presence of liquids in the gas, their respective two-phase multipliers will contain independent information, meaning that the differential pressure ratio will be a function (F) of the Lochard-Martinelli number and of the gas fraction and of the individual densities:

$$\frac{\Delta p_2}{\Delta p_1} = F(X_{LM}) \quad (14)$$

$$X_{LM} = X_{LM}(\alpha_g, \rho_l, \rho_g) \quad (15)$$

When the phase densities are known in advance, the measured differential pressure ratio can hence be used to determine gas fraction 102, solving Eqs. (14) and (15) for the gas mass fraction. Liquid fraction 104 is found from gas fraction 102, because their sum must be equal to 1:

$$\alpha_g + \alpha_l = 1 \quad (16)$$

In embodiments wherein sheltered device 40 is a plurality of EIS electrodes, phase fraction 106 can be determined from data (not shown) in the form of conductivity measurements generated by the EIS electrodes along internal circumference 304. While the liquid phases of multiphase flow 200, e.g., water and oil, can conduct electricity, the gas phase of multiphase flow 200 cannot. Thus, phase fraction 106 can be determined from percentage of multiphase flow 200 at the cross-sectional area of pipe 300 at internal circumference 304 that conducts electricity divided by the percentage of multiphase flow 200 at the cross-sectional area of pipe 300 at internal circumference 304 that does not conduct electricity.

In embodiments wherein sheltered device 40 is a microwave sensor located at cavity 26, liquid composition 108 can be a function of a shift in a peak resonating frequency in an electromagnetic field generated by the microwave sensor at cavity 26 and a change in attenuation, being the amount of energy in the electromagnetic field circulating in cavity 26. A shift in the peak resonating frequency can be brought about through interaction of multiphase flow 200 with the electromagnetic field, and a change in attenuation can be brought about by, e.g., water within multiphase flow 200 absorbing energy in the electromagnetic field. The shift in peak resonating frequency and the change in attenuation can be determined from data (not shown) generated by the microwave sensor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus for use in determining a plurality of characteristics Of a multiphase flow within a pipe, the apparatus comprising:
   first and second constrictions;
   a sheltered zone between the first and second constrictions, the sheltered zone comprising a conical section expanding from the first constriction and a cylindrical section in the sheltered zone extending from the conical section;
   a sensing device coupled to an interior wall of the pipe;
   and a sheltered measurement device coupled to the interior wall of the pipe and located within the sheltered zone;
   wherein a first characteristic of the plurality of characteristics is determinable from data generated by the sensing device; and
   wherein a second characteristic of the plurality of characteristics is determinable from data generated by the sheltered measurement device.

2. The apparatus of claim 1, further comprising a second cylindrical section extending from the second constriction away from the sheltered zone, wherein the second cylindrical section is shorter than the conical section of the sheltered zone.

3. The apparatus of claim 1, wherein the sensing device is a plurality of pressure sensors.

4. The apparatus of claim 3, wherein a face of at least one of the pressure sensors is recessed into the interior wall of the pipe.

5. The apparatus of claim 3, wherein at least one of the pressure sensors is located within the sheltered zone.

6. The apparatus of claim 1, wherein the first characteristic is a gas fraction.

7. The apparatus of claim 1, wherein the first characteristic is a liquid fraction.

8. The apparatus of claim 1, wherein the sheltered measurement device is a plurality of electrical impedance spectroscopy (EIS) electrodes.

9. The apparatus of claim 8, wherein at least two of the EIS electrodes are arranged in a ring configuration encircling an internal circumference of the pipe.

10. The apparatus of claim 8, wherein a face of one of the EIS electrodes is embedded in a dielectric material.

11. The apparatus of claim 1, wherein the second characteristic is a phase fraction.

12. The apparatus of claim 1, wherein the sheltered measurement device is a microwave sensor.

13. The apparatus of claim 12, wherein the microwave sensor is located in a cavity extending from the sheltered zone.

14. The apparatus of claim 1, wherein the second characteristic is a liquid composition.

15. The apparatus of claim 1, wherein the sheltered measurement device is a pair of ultrasonic transducers.

16. The apparatus of claim 1, further comprising a second cylindrical section extending upstream from the first constriction away from the sheltered zone;
a third cylindrical section extending downstream from the second constriction away from the sheltered zone; and
wherein the second and third cylindrical sections comprise diameters that are both less than a diameter of the cylindrical section in the sheltered zone.

17. An apparatus for use in determining a plurality of characteristics of a multiphase flow within a pipe, the apparatus comprising:
first and second constrictions;
a sheltered zone between the first and second constrictions, the sheltered zone comprising a conical section expanding from the first constriction and a cylindrical section in the sheltered zone extending from the conical section;
a plurality of pressure sensors coupled to an interior wall of the pipe; and
a sheltered measurement device coupled to the interior wall of the pipe and located within the sheltered zone;
wherein first and second characteristics of the plurality of characteristics are determinable from data generated by the pressure sensors; and
wherein a third characteristic of the plurality of characteristics is determinable from data generated by the sheltered measurement device.

18. The apparatus of claim 17, wherein the sheltered measurement device is a plurality of electrical impedance spectroscopy (EIS) electrodes.

19. The apparatus of claim 17, wherein the sheltered measurement device is a microwave sensor.

20. The apparatus of claim 17, wherein the sheltered measurement device is a pair of ultrasonic transducers.

* * * * *